United States Patent [19]

Arai

[11] Patent Number: 4,468,720
[45] Date of Patent: Aug. 28, 1984

[54] VARIABLE MASK DEVICE FOR AN ILLUMINATOR

[76] Inventor: Akira Arai, 32-7 Soshigaya 1-chome, Setagaya-ku, Tokyo-to, Japan

[21] Appl. No.: 295,620

[22] Filed: Aug. 24, 1981

Related U.S. Application Data

[63] Continuation of Ser. No. 52,753, Jun. 28, 1979, abandoned.

[30] Foreign Application Priority Data

Jul. 10, 1978 [JP] Japan ................... 53-84368

[51] Int. Cl.³ .......................................... F21V 11/18
[52] U.S. Cl. .................................. 362/281; 362/283; 362/18; 362/323; 353/88
[58] Field of Search ................. 362/18, 281–284, 362/321–324; 353/88

[56] References Cited

U.S. PATENT DOCUMENTS

| | | | |
|---|---|---|---|
| 2,210,554 | 8/1940 | Palermo | 362/322 |
| 2,553,094 | 3/1931 | Jarrett | 362/322 |
| 2,944,145 | 7/1960 | Legge | 362/322 |
| 3,551,033 | 12/1970 | Beesley | 362/322 |
| 4,104,709 | 8/1978 | Kloots | 362/321 |
| 4,208,100 | 6/1980 | Bischl | 362/281 X |
| 4,233,650 | 11/1980 | Hagner et al. | 362/283 X |

FOREIGN PATENT DOCUMENTS 48-37504 11/1973 Japan .

*Primary Examiner*—Peter A. Nelson
*Attorney, Agent, or Firm*—Birch, Stewart, Kolasch & Birch

[57] ABSTRACT

A variable mask device for use with an illuminator comprising a projection window, a plurality of variable mask plates for optionally varying the size and shape of the projection window and means operatively connected to said variable mask device for inclining said mask device with respect to the projection axis within a predetermined angular range. Means are also provided for rotating the mask device around the projection axis.

7 Claims, 5 Drawing Figures

VARIABLE MASK DEVICE FOR AN ILLUMINATOR

This application is a continuation, of copending application Ser. No. 52,753, filed on June 28, 1979, and now abandoned.

BACKGROUND AND SUMMARY OF THE INVENTION

The present invention relates to a variable mask device for an illuminator or the like, and more particularly to a variable mask device wherein a luminous area provided by the illuminator or the like can be definitely outlined or focussed in an optical manner in conformity with an area to be illuminated, as projection frame lines in a slide projector or the like. Said definitely outlined luminous area can be varied both in size and shape, for example, into a square, rhombic, trapezoidal or circular shape, for effective spot illumination within an ordinary room, for example, an exhibition hall or the like.

Variable mask devices of this general type are well known from, for example, utility model publication 48-37507 by the applicant, wherein the variable mask device comprises a pair of support frames each having a central opening defining the projection window interposed between the source lamp and the projector lens of the illuminator and secured at four corners, integrally to the body of the illuminator so that four mask plates may be slidably inserted between said pair of support frames from four sides thereof substantially toward the center of said projection window and may be rotated to obtain a luminous area of desired size and shape.

However, with such a prior art device, it is difficult to focus the outline of the luminous area defined by the mask plates over the total area to be illuminated when a framed picture hung on the wall, for example, is illuminated obliquely from above. To overcome such a problem, it has already been well known to provide two sets of mask plates a predetermined distance, spaced apart from each other along the projection axis. Although the problems have been improved to some degree, it still remains impossible to focus, for example, a projected image of a slide or the like, inserted into the projection window, over the total area to be illuminated.

Accordingly, an object of the present invention is to provide a variable mask device for an illuminator or the like, by which the light image can be focussed over the total area to be illuminated, even when said area to be illuminated is inclined with respect to the projection axis.

Another object of the present invention is to provide a variable mask device permitting an outline of the luminous area formed by the variable mask plates to be freely rotated around the projection axis, thereby overcoming the drawback of the prior art devices that it is restricted and difficult to rotate and slide the four variable mask plates and thereby to rotate said outline around the projection axis.

Still another object of the present invention is to provide a variable mask device for an illuminator or the like which is adapted to simultaneously achieve the above defined objects.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be now described by way of reference to the accompanying drawings wherein one of the corresponding devices of the prior art is also illustrated.

Figure 1:
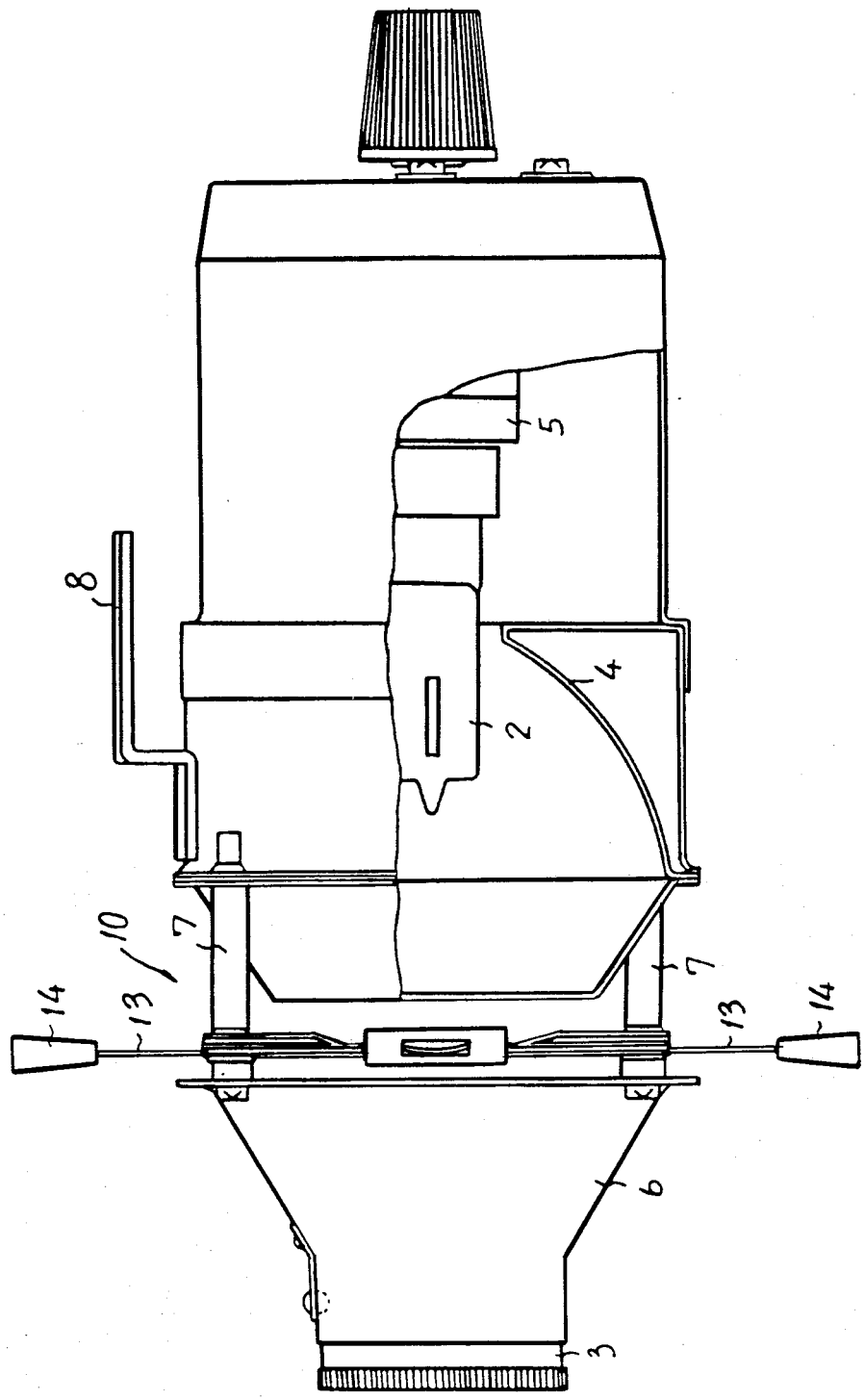
FIG. 1 is a side view illustrating a manner in which the device of prior art is operated.

The variable mask device 10 of the prior art is shown in FIG. 1, integrally mounted by supporting members 7 between a source lamp 2 of an illuminator and a projector lens 3. Said source lamp 2 is held in a socket 5 at the center of a reflector 4 and said projector lens 3 is focus adjustably mounted on a lens holder 6.

Figure 2:
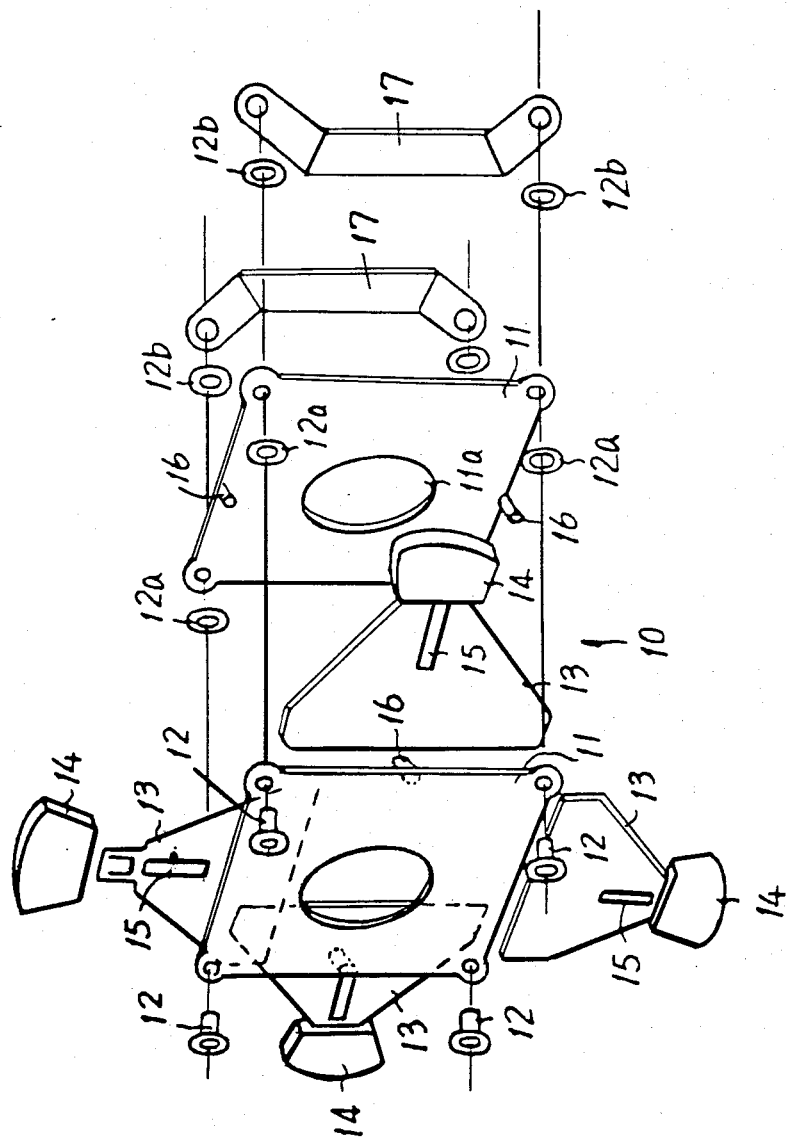
FIG. 2 is a perspective view illustrating the important elements of the device of the prior art, as disassembled.

FIG. 2 illustrates the variable mask device 10 of the prior art as disassembled, wherein the device 10 comprises a pair of substantially square support frames 11 secured at respective corners in correct register by grummets 12 or the like. Four mask plates 13 are adapted to be interposed between said pair of support frames 11 at respective sides thereof and to be slidably movable toward and away from the center of a projection window 11a defined by respective central openings disposed in the individual frames. The pair of support frames 11 are, in turn, secured by portions of said grummets 12 to the supporting members 7 of the illuminator 1. The mask plates 13 are adapted to be advanced toward the center of the projection window 11a so that each pair of opposing mask plates 13 may together completely cover the projection window 11a. Each mask plate 13 has a guide slit 15 extending in the direction along which the mask plate 13 is movable, and a guide pin 16 is provided on the support frame 11 at the associated edge thereof so as to loosely engage the guide slit 15. Each mask plate 13 is substantially triangular and has at its outer end an operating knob 14 made of a plastic material and with which it is possible to rotate the mask plate 13 around said guide pin 16. Accordingly, each mask plate 13 may be linearly or angularly moved with the operating knob 14 to adjust the actual shape and size of the projection window 11a and thereby to select the shape and size of the illumination area outline so that the illumination may be adapted to the shape as well as the size of an object to be illuminated. A pair of presser plates 17 are integrally mounted by the grummets 12 behind the support frame pair 11 with the interposition of washers 12b so that the presser plate pair 17 and support frame pair 11 may carry therebetween the article to be projected, such as a diaphragm or a slide serving to change the shape of the projection window 11a.

As previously described, the illuminator 1 of the above mentioned arrangement is usually, stationarily installed by a mounting member 8 or the like on a location adjacent the floor or the ceiling to illuminate obliquely in the upward or downward direction an object such as a framed picture hung on the wall. In such an application, however, the distance of the projection provided through the projection window 11a defined by the pair of variable mask plates 13 has considerably varied, depending upon the points in the illuminated area such as said framed picture, since the variable mask device 10 is fixed in substantially perpendicular relationship to the projection axis. In consequence, it has been sometimes impossible, even when the projector lens 3 is adjustably focussed, to achieve an illumination which can provide a definitely outlined luminous area covering all the object to be illuminated. Furthermore, operation of angularly displacing each variable mask plate 13 within the variable mask means 10 integrally secured to the illuminator 1 has been inevitably subject to limitations, so that sometimes it has been impossible to rotate the luminous area having a form given by the variable mask plates 13, around the projection axis and thereby bring the luminous area into coincidence with the form of said framed picture to be illuminated.

Figure 3:
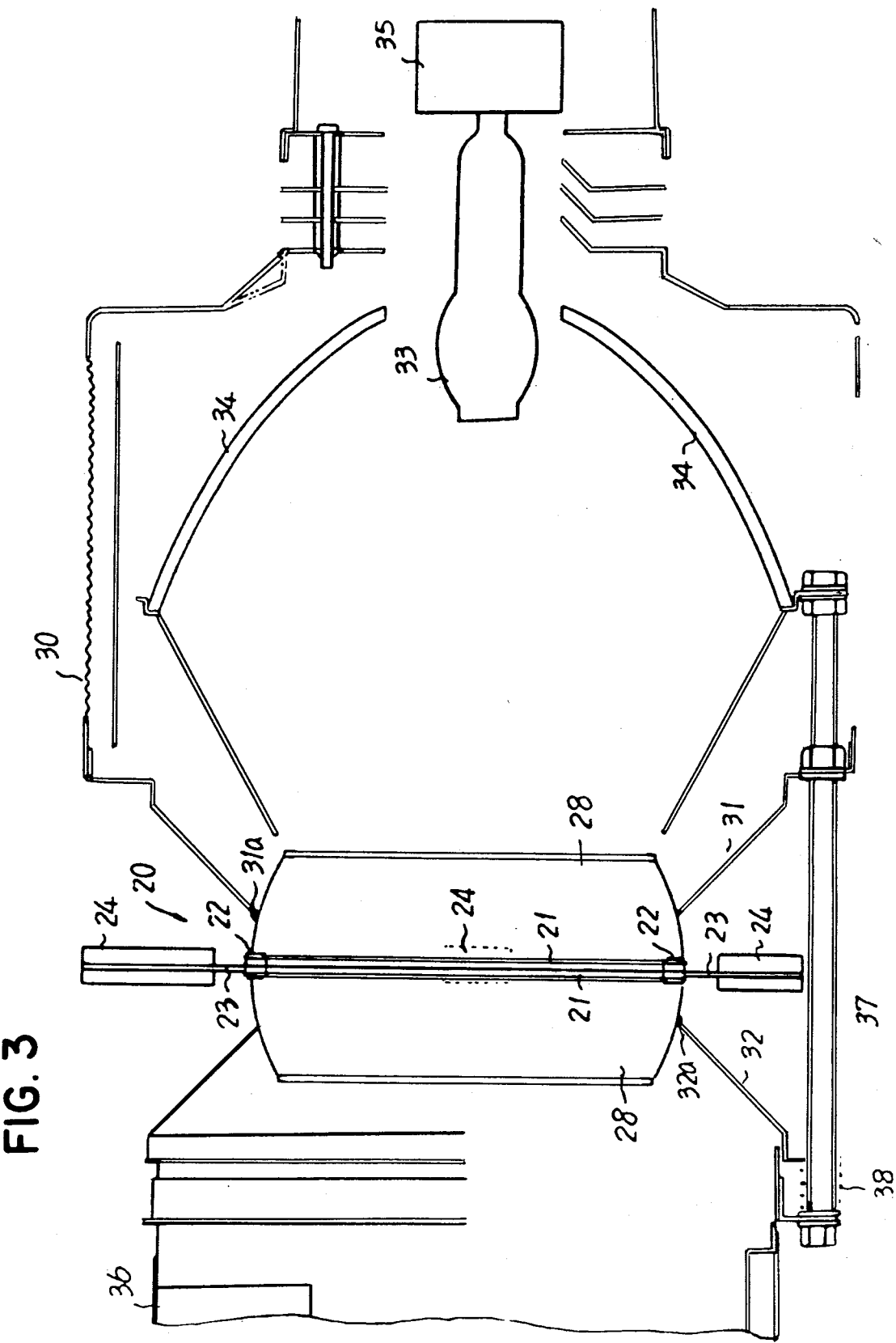
FIG. 3 is a side view illustrating, as partially broken, an embodiment of the device according to the present invention.
Figure 4:
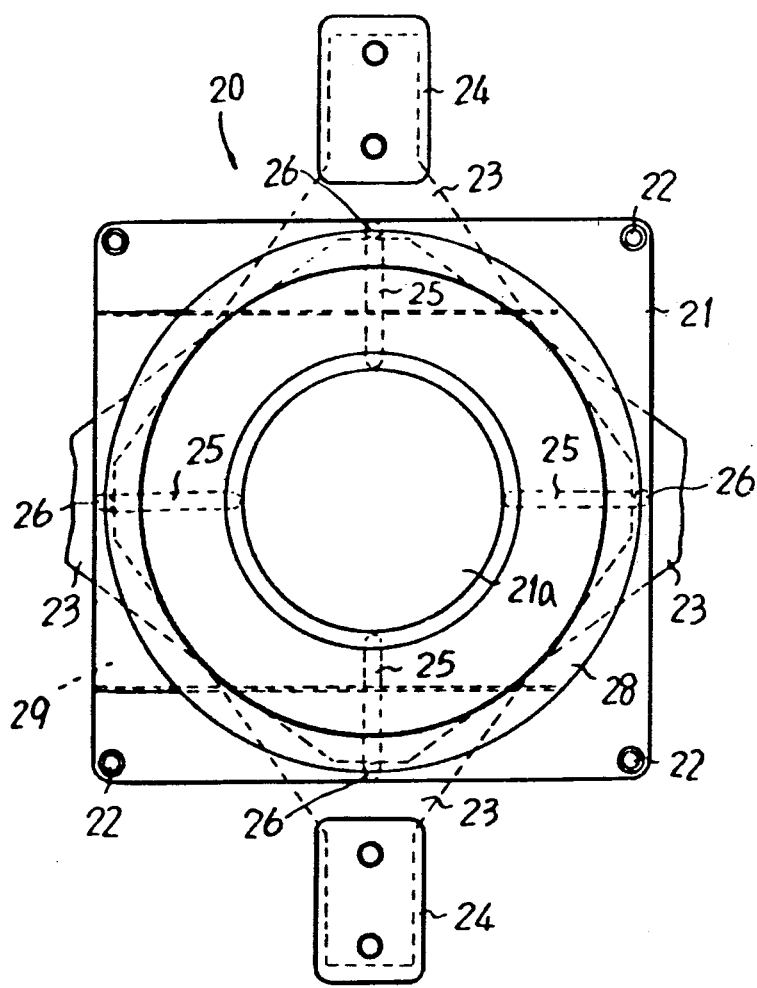
FIG. 4 is a front view illustrating the important elements of the embodiment illustrated by FIG. 3.
Figure 5:
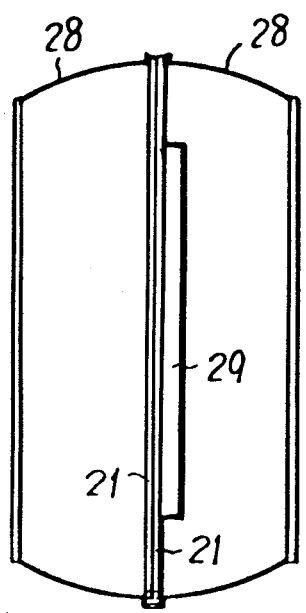
FIG. 5 is a side view illustrating the important elements of the embodiment illustrated by FIG. 3.

According to the apparatus of the present invention, in order to overcome the drawbacks as mentioned above, there is provided a cylindrical, slidable frame 28 presenting a spheric surface integral with the outer wall of a pair of support frames 21 of a variable mask device 20. The slidable frame 28 is supported by cylindrical support-and-guide frames 31, 32 of an illuminator 30, as shown by FIGS. 3 through 5. The support-and-guide frames 31, 32 respectively, have openings 31a, 32a adapted to bear against the slidable frame 28 along the outer wall presenting a spheric surface and thereby support and guide it. In the embodiment shown, the support-and-guide frame 31 at the light source side is stationarily mounted, at its base, integrally on the illuminator 30 while the support-and-guide frame 32 at the projector lens holder 36 side is mounted on a supporting member 37, with said opening 32a being biased under the action of a compression spring 38 against the slidable frame 28. The variable mask device 20 comprises, as shown by FIG. 4, a pair of support frames 21 secured at respective corners in correct register by grummets 22 and four mask plates 23 adapted to be slidably and rotatably interposed between said pair of support frames 21 in the same manner as the variable mask means of the prior art. Element 24 designates operating knobs for the respective variable mask plates 23, apertures 25 define guide grooves, and elements 26 define guide pins. As seen from FIG. 5, there is provided an insertion slit 29 in one-half of the slidable frame 28, extending along one of the support frames 21, so that the article to be projected, such as a slide or a diaphragm adapted to change the shape of the projection window 21a may be inserted through said slit 29, whereby the projection window 21a may be partially or entirely covered. Referring to FIG. 3, element 33 designates a source lamp held by a socket 35, element 34 designates a reflector, element 36 defines a lens holder adapted to hold the focus-adjustable projector lens, and element 37 defines a supporting member for said reflector 34.

With the device constructed as mentioned above, according to the present invention, the slidable frame 28 having a spheric surface is supported by the support-and-guide frames 31, 32 between the source lamp and the projector lens, as seen from FIG. 3, so that the variable mask device 20 can be freely inclined with respect to the projection axis and rotated therearound. When a framed picture hung on a wall, for example, is illuminated obliquely from above by the illuminator 30 including the device according to the present invention, the projection window 21a defined by the variable mask plates 23 may be angularly adjusted with respect to the projection axis to provide the optimal illumination so as to cover all the area to be illuminated with a definitely outlined luminous area. Furthermore, the projection window 21a defined by the variable mask plates 23 is freely rotatably around the projection axis and, accordingly, it is readily possible to provide an illumination in conformity with the form of the framed picture to be illuminated by suitably rotating the luminous area of a given shape defined by the variable mask plates 23, without either rotating the illuminator 30 itself or rotating the variable mask plates 23. When the projection window 21a is provided with the diaphragm or the article to be projected, such as for example a slide, the projected image thereof can be precisely focussed over the total area to be illuminated and such image can be rotated around the projection axis.

With the device according to the present invention, as described hereinabove, the projection window receiving a substantially uniform light from the light source can be freely inclined with respect to the projection axis so that the light image may be definitely focussed over the entire luminous area, even when the projection axis is considerably inclined with respect to the area to be illuminated. Furthermore, the shape of the projection window defined by the variable mask plates is rotatable around the projection axis and consequently the shape of luminous area provided by projection can be easily adapted to the shape of the object to be illuminated such as the framed picture hung on the wall. The device according to the present invention thus achieves the objects as previously set forth and can be effectively used in practice.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A variable mask device comprising:
   a housing;
   a support for positioning the housing in a preselected angular position;
   an illuminator operatively mounted at one end of said housing;
   an adjustable lens operatively mounted at an end of said housing displaced from said illuminator;
   a plurality of variable mask plates operatively positioned within said housing and being disposed between said illuminator and said lens for varying an aperture shape and size of the output light of said mask device;
   a support frame;

said plurality of variable mask plates being selectively, adjustably positioned within said support frame, said support frame being operatively disposed within a slidable frame mounted for inclination and rotation in two separate transverse directions with respect to a projection axis passing longitudinally through the variable mask device from said illuminator to said lens;

wherein the plurality of mask plates are selectively, respectively inclinable and rotatable in each of said two separate transverse directions with respect to the projection axis to modify the shape of an area to be illuminated without changing an angle of inclination of said projection axis with said housing remaining stationary during inclination and rotation of said mask plates.

2. A variable mask device according to claim 1, said slidable frame having a partially spherical outer surface which mates with support-and-guide frames attached to said housing for adjustably positioning the plurality of mask plates relative to said projection axis.

3. A variable mask device according to claim 2, wherein at least one support-and-guide frame is spring biased relative to said housing and against said slidable frame.

4. A variable mask device according to claim 1, and further including a slit in said support frame for positioning a slide or diaphragm relative to said projection axis.

5. A variable mask device comprising:
a housing;
an illuminator mounted at one end of said housing;
an adjustable lens mounted at an end of said housing displaced from said illuminator;
a support for positioning said housing in a preselected angular position;
a support frame being operatively mounted within said housing between said illuminator and said adjustable lens and including a projection window being disposed therein;
a plurality of variable mask plates being selectively, adjustably positioned within said support frame for varying the size and shape of the projection window;
a pair of slidable frames having a partially spherical outer surface projected on both sides of said support frame; and
a pair of support-and-guide frames operatively mounted on said housing for mating with said pair of slidable frames for inclining and rotating said support frame with respect to the pair of support-and-guide frames;

wherein said plurality of mask plates are operatively connected to said housing for respective inclination and rotation in each of two separate transverse directions with respect to a projection axis passing longitudinally through said projection window from said illuminator to said lens without changing an angle of inclination of said projection axis with said housing remaining stationary during inclination and rotation of said mask plates.

6. A variable mask device according to claim 5, wherein at least one support-and-guide frame is spring biased relative to said housing and against said slidable frame.

7. A variable mask device according to claim 5, and further including a slit in said support frame for positioning a slide or diaphragm relative to said projection axis.

* * * * *